US012787067B2

(12) United States Patent
Agiwal et al.

(10) Patent No.: US 12,787,067 B2
(45) Date of Patent: Nov. 3, 2026

(54) METHOD AND APPARATUS FOR PERFORMING RANDOM ACCESS IN WIRELESS COMMUNICATION SYSTEM

(71) Applicant: Samsung Electronics Co., Ltd., Suwon-si (KR)

(72) Inventors: Anil Agiwal, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 18/577,816

(22) PCT Filed: Sep. 30, 2022

(86) PCT No.: PCT/KR2022/014726

§ 371 (c)(1),
(2) Date: Jan. 9, 2024

(87) PCT Pub. No.: WO2023/055160

PCT Pub. Date: Apr. 6, 2023

(65) Prior Publication Data

US 2024/0314846 A1 Sep. 19, 2024

(30) Foreign Application Priority Data

Sep. 30, 2021 (KR) ........................ 10-2021-0130099

(51) Int. Cl.

| | |
|---|---|
| ***H04W 74/08*** | (2024.01) |
| ***H04W 74/00*** | (2009.01) |
| ***H04W 74/0833*** | (2024.01) |
| *H04W 74/0838* | (2024.01) |

(52) U.S. Cl.

CPC ..... *H04W 74/0833* (2013.01); *H04W 74/006* (2013.01); *H04W 74/0838* (2024.01)

(58) Field of Classification Search

None

See application file for complete search history.

(56) References Cited

U.S. PATENT DOCUMENTS

| | | | | |
|---|---|---|---|---|
| 10,278,160 | B2 | 4/2019 | Agiwal et al. | |
| 2019/0182870 | A1 * | 6/2019 | Shih .................... | H04W 74/004 |
| 2021/0013949 | A1 | 1/2021 | Agiwal et al. | |
| 2021/0219345 | A1 | 7/2021 | Agiwal et al. | |
| 2021/0307078 | A1 | 9/2021 | Singh et al. | |

(Continued)

FOREIGN PATENT DOCUMENTS

| | | | |
|---|---|---|---|
| JP | 2020-162105 | A | 10/2020 |
| WO | 2020/032618 | A1 | 2/2020 |

OTHER PUBLICATIONS

Apple Inc.; Views on Rel-17 DSS SCell scheduling PCell; 3GPP TSG-RAN WG1 Meeting #104b-e; R1-2103126; e-Meeting; Apr. 12-20, 2021; Apr. 7, 2021.

(Continued)

*Primary Examiner* — Willie J Daniel, Jr.

(74) *Attorney, Agent, or Firm* — Jefferson IP Law, LLP

(57) ABSTRACT

The disclosure relates to a 5G or 6G communication system for supporting a higher data transmission rate. The disclosure relates to a wireless communication system. Specifically, the disclosure relates to an apparatus, a method and a system for PDCCH monitoring.

20 Claims, 4 Drawing Sheets

(56) References Cited

U.S. PATENT DOCUMENTS

2022/0132564 A1 4/2022 Ouchi et al.

OTHER PUBLICATIONS

Samsung; Cross-carrier scheduling from SCell to PCell; 3GPP TSG RAN WG1 #104bis-e; R1-2103262; e-Meeting, Apr. 12-20, 2021; Apr. 7, 2021.

International Search Report with Written Opinion dated Jan. 10, 2023; International Appln. No. PCT/KR2022/014726.

* cited by examiner

[Fig. 1]
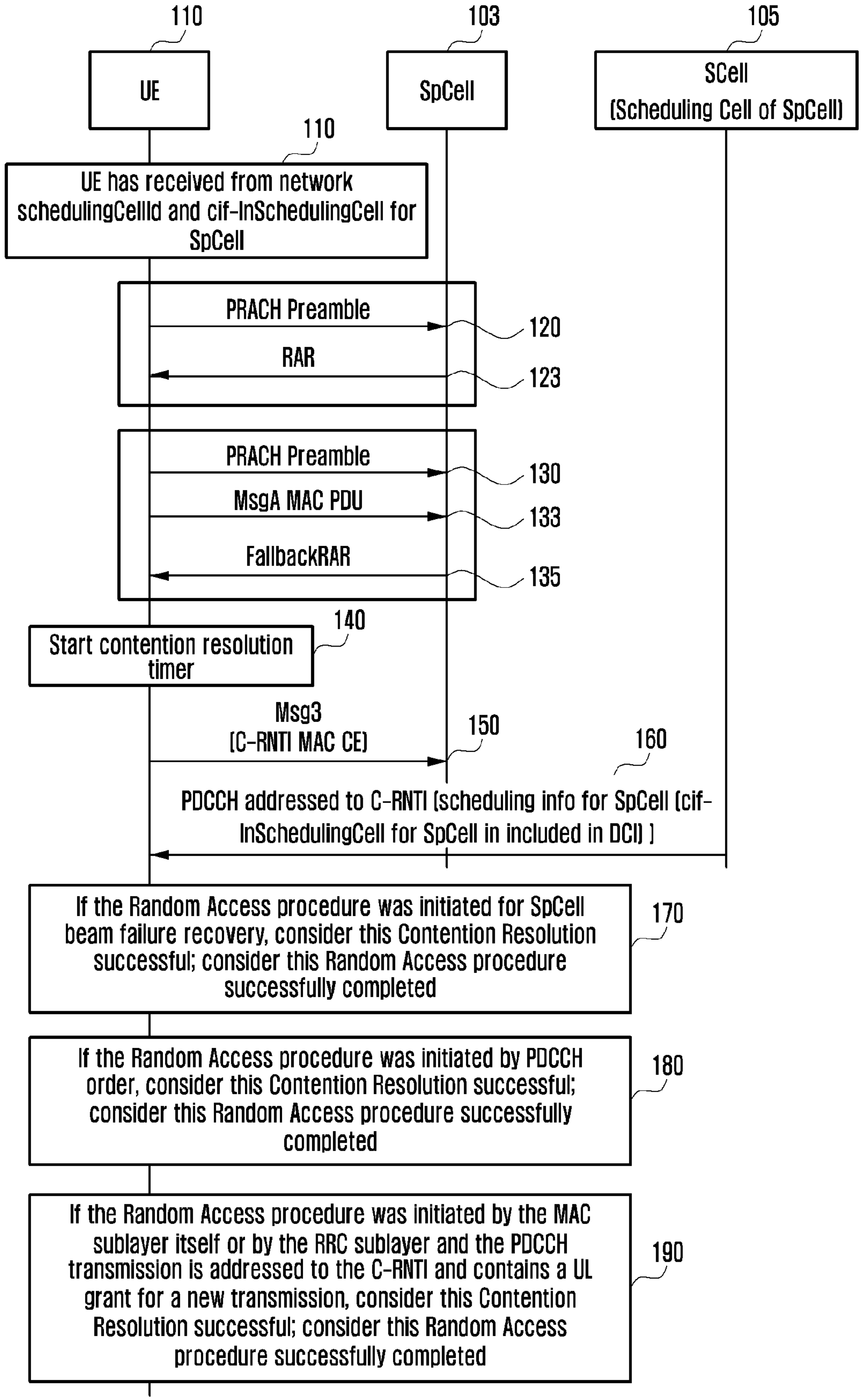

[Fig. 2]
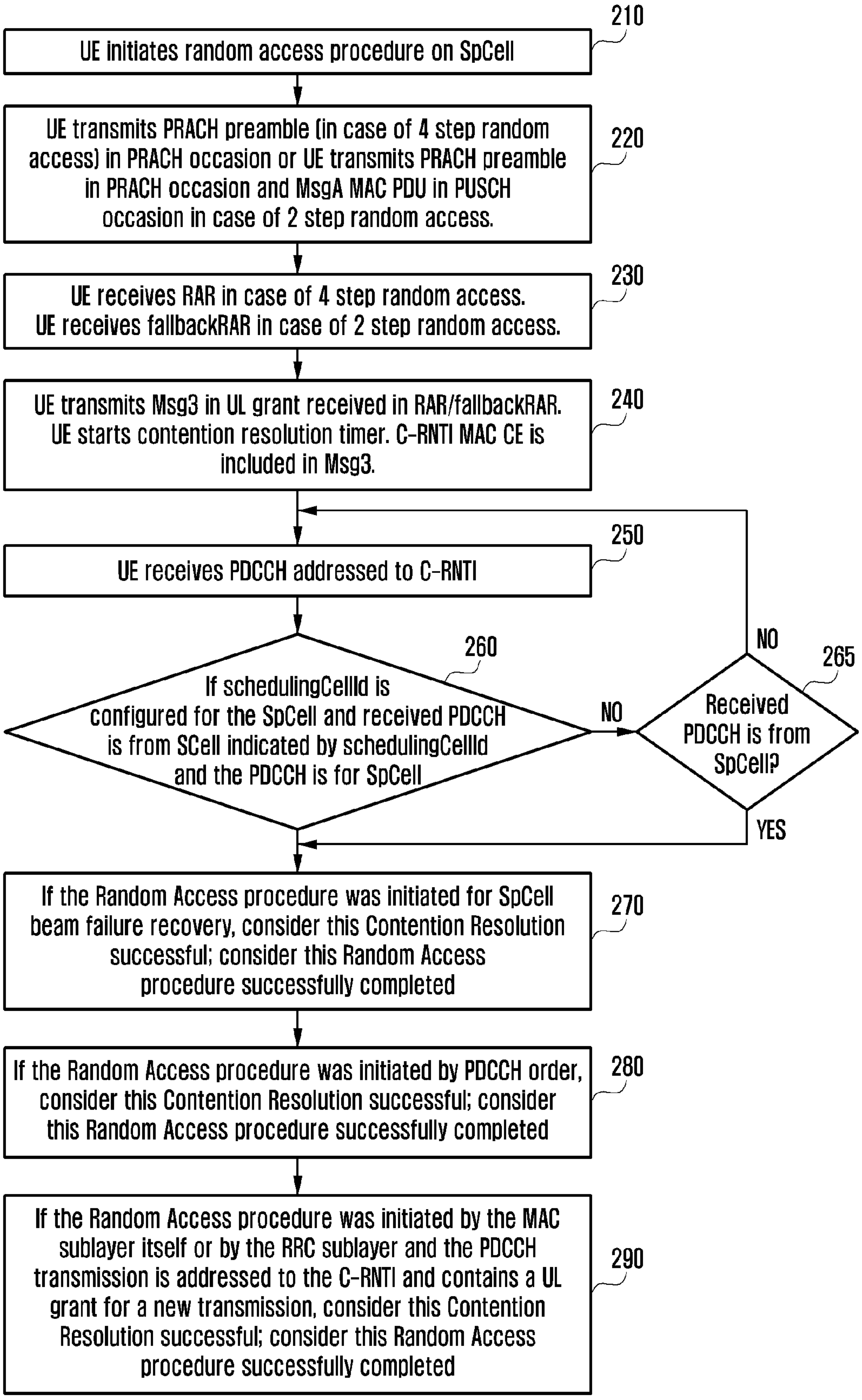

[Fig. 3]
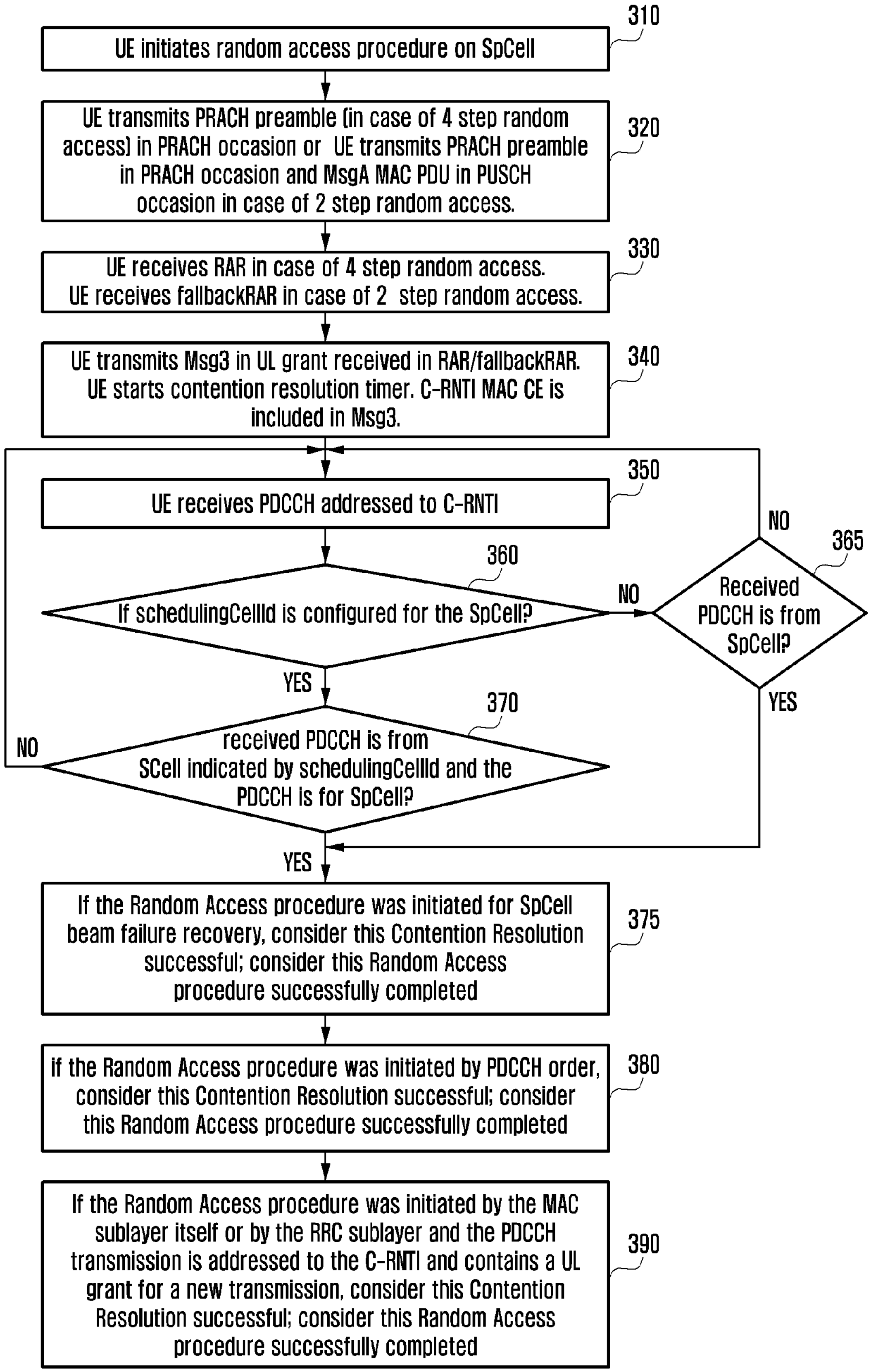

[Fig. 4]
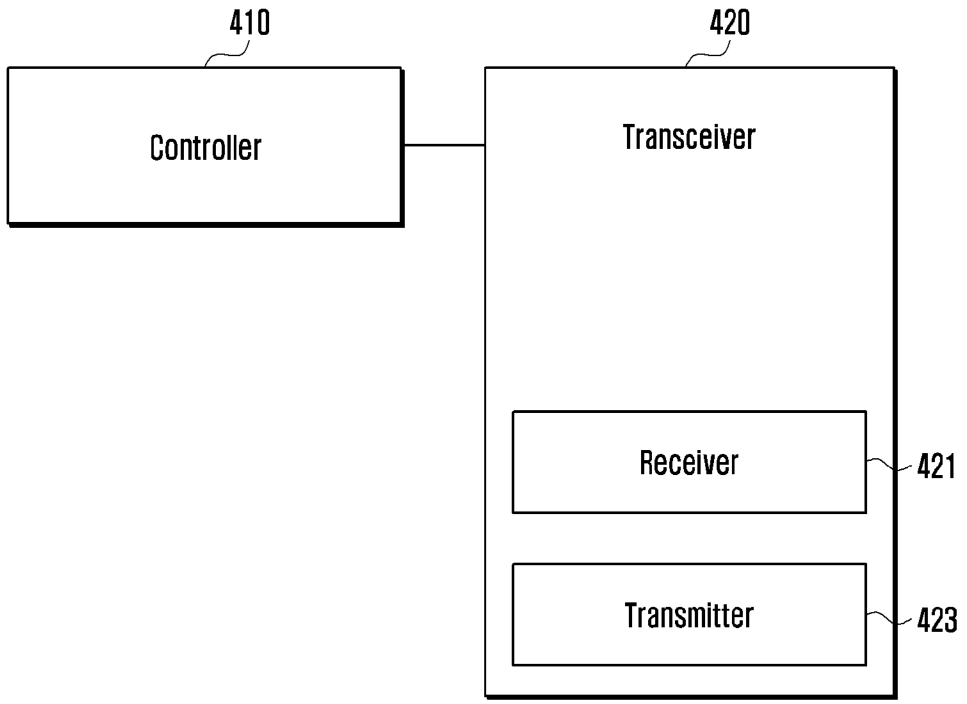
[Fig. 5]
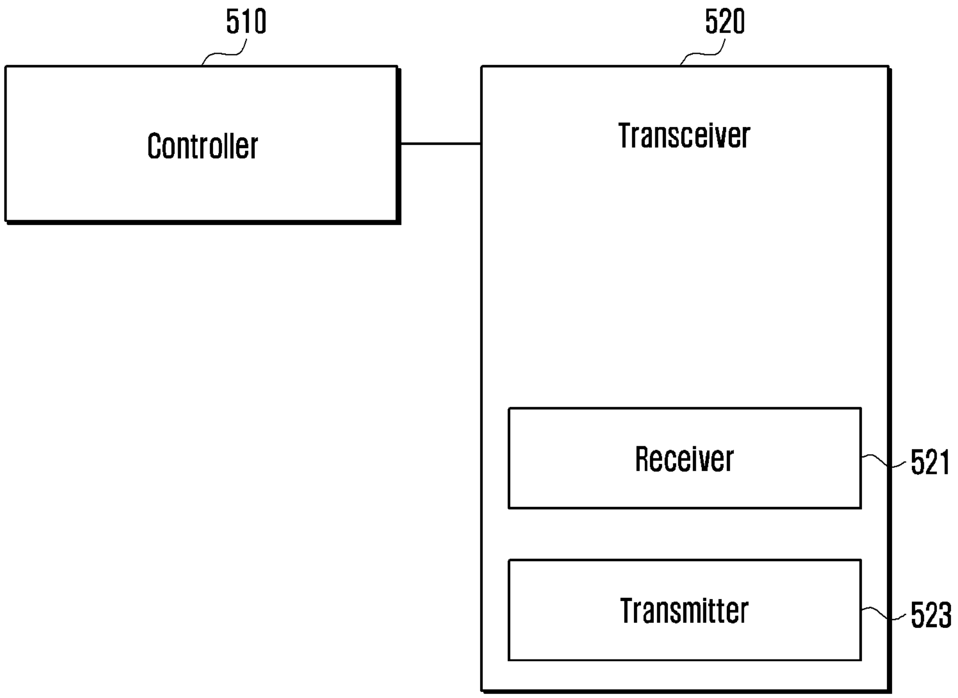

METHOD AND APPARATUS FOR PERFORMING RANDOM ACCESS IN WIRELESS COMMUNICATION SYSTEM

TECHNICAL FIELD

The disclosure relates to a wireless communication system. Specifically, the disclosure relates to an apparatus, a method and a system for PDCCH monitoring.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

DISCLOSURE OF INVENTION

Technical Problem

The disclosure proposes an apparatus, a method and a system for PDCCH monitoring.

The disclosure proposes an apparatus, a method and a system for enhanced contention resolution procedure in case of DSS.

The technical subjects pursued in the disclosure may not be limited to the above mentioned technical subjects, and other technical subjects which are not mentioned may be clearly understood, through the following descriptions, by those skilled in the art to which the disclosure pertains.

Solution to Problem

In accordance with an aspect of the disclosure, a method performed by a terminal in a wireless communication system is provided. The method comprises: receiving, from a base station, configuration information on a special cell (SpCell); transmitting, to the SpCell, a random access preamble; receiving, from the SpCell, a random access response as a response to the random access preamble; transmitting, to the SpCell, a message 3 (Msg3) based on the random access response; and in case that the configuration information comprises information indicating that scheduling information for the SpCell is transmitted on a secondary cell (SCell), receiving, from the SCell, a PDCCH for the SpCell as a response to the Msg3.

In an embodiment, the method further comprises in case that the configuration information does not comprise the information indicating that scheduling information for the SpCell is transmitted on the SCell, receiving, from the SpCell, a PDCCH for the SpCell as a response to the Msg3.

In an embodiment, the method further comprises starting a contention resolution timer in case that the Msg3 is transmitted, and the PDCCH is received during the contention resolution timer is running.

In an embodiment, the method further comprises in case that the random access preamble is for 2 step random access procedure and the configuration information comprises the information indicating that scheduling information for the SpCell is transmitted on the SCell, receiving, from the SCell, a PDCCH for the SpCell, as a response to the random access preamble.

In an embodiment, the information indicating that scheduling information for the SpCell is transmitted on the SCell comprises at least one of indication indicating whether the scheduling information for the SpCell is transmitted on the SCell, or identifier of the SCell.

In accordance with an aspect of the disclosure, a method performed by a base station in a wireless communication system is provided. The method comprises: transmitting, to a terminal, configuration information on a special cell (SpCell); receiving, from the terminal on the SpCell, a random access preamble; transmitting, to the terminal on the SpCell, a random access response as a response to the random access preamble; receiving, from the terminal the SpCell, a message 3 (Msg3) based on the random access response; and in case that the configuration information comprises information indicating that scheduling information for the SpCell is transmitted on a secondary cell (SCell), transmitting, to the terminal on the SCell, a PDCCH for the SpCell as a response to the Msg3.

In an embodiment, the method further comprises in case that the configuration information does not comprise the information indicating that scheduling information for the SpCell is transmitted on the SCell, transmitting, to the terminal the SpCell, a PDCCH for the SpCell as a response to the Msg3.

In an embodiment, the method further comprises in case that the random access preamble is for 2 step random access procedure and the configuration information comprises the information indicating that scheduling information for the SpCell is transmitted on the SCell, transmitting, to the terminal the SCell, a PDCCH for the SpCell, as a response to the random access preamble.

In accordance with an aspect of the disclosure, a terminal in a wireless communication system is provided. the terminal comprises a transceiver; and a controller coupled with the transceiver and configured to: receive, from a base station, configuration information on a special cell (SpCell), transmit, to the SpCell, a random access preamble, receive, from the SpCell, a random access response as a response to the random access preamble, transmit, to the SpCell, a message 3 (Msg3) based on the random access response, and in case that the configuration information comprises information indicating that scheduling information for the SpCell is transmitted on a secondary cell (SCell), receive, from the SCell, a PDCCH for the SpCell as a response to the Msg3.

In accordance with an aspect of the disclosure, a base station in a wireless communication system is provided. the base station comprises a transceiver; and a controller coupled with the transceiver and configured to: transmit, to a terminal, configuration information on a special cell (SpCell), receive, from the terminal on the SpCell, a random access preamble, transmit, to the terminal on the SpCell, a random access response as a response to the random access preamble, receive, from the terminal the SpCell, a message 3 (Msg3) based on the random access response, and in case that the configuration information comprises information indicating that scheduling information for the SpCell is transmitted on a secondary cell (SCell), transmit, to the terminal on the SCell, a PDCCH for the SpCell as a response to the Msg3.

Advantageous Effects of Invention

According to an embodiment of the disclosure, an apparatus, a method and a system for PDCCH monitoring are proposed.

According to an embodiment of the disclosure, an apparatus, a method and a system for enhanced contention resolution procedure in case of DSS are proposed.

Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

FIG. 1 is an example signalling flow according to this method of disclosure wherein UE transmit C-RNTI MAC CE in Msg3 and SpCell scheduling by SCell is supported.

FIG. 2 is an example UE operation according to this method of disclosure wherein UE transmit C-RNTI MAC CE in Msg3.

FIG. 3 is an example UE operation according to this method of disclosure wherein UE transmit C-RNTI MAC CE in Msg3.

FIG. 4 is a diagram illustrating a configuration of a terminal according to the disclosure.

FIG. 5 is a diagram illustrating a configuration of a base station according to the disclosure.

MODE FOR THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A "base station (BS)" is an entity communicating with a user equipment (UE) and may be referred to as a BS, a base transceiver station (BTS), a radio access network (RAN), a node B (NB), an evolved NB (eNB), an access point (AP), a fifth generation (5G) NB (5GNB), or a next generation NB (gNB).

A "user equipment (UE)" is an entity communicating with a BS and may be referred to as a UE, a device, a mobile station (MS), a mobile equipment (ME), or a terminal.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analysing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

CA (carrier aggregation)/Multi-connectivity in fifth generation wireless communication system: The fifth generation wireless communication system, supports standalone mode of operation as well dual connectivity (DC). In DC a multiple Rx/Tx UE may be configured to utilise resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT (radio access technology) Dual Connectivity (MR-DC) operation whereby a UE in RRC_CONNECTED is configured to utilise radio resources provided by two distinct schedulers, located in two different nodes connected via a non-ideal backhaul and providing either E-UTRA (i.e. if the node is an ng-eNB) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) (SpCell(s)) and all secondary cells. In NR the term Master Cell Group (MCG) refers to a group of serving cells associated with the Master Node, comprising of the PCell (primary cell) and optionally one or more SCells (secondary cells). In NR the term Secondary Cell Group (SCG) refers to a group of serving cells associated with the Secondary Node, comprising of the PSCell (primary secondary cell) and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

Random access in fifth generation wireless communication system: In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/ modification, beam failure recovery and data or control information transmission in UL by non-synchronized UE in RRC CONNECTED state. Several types of random access procedure is supported.

Contention based random access (CBRA): This is also referred as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+14*t_id+14*80*f_id+14*80*8*ul_carrier_id, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/ RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for secondary cell (Scell), etc. Evolved node B (eNB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non dedicated preamble. Dedicated preambles is typically provided for a subset of SSBs/CSI RSs (synchronization signal blocks/channel state information reference signals). If there is no SSB/CSI RS having DL (downlink) RSRP (reference-signal received power) above a threshold amongst the SSBs/CSI RSs for which contention free random access resources (i.e. dedicated preambles/ROs) are provided by gNB, UE select non dedicated preamble. Otherwise UE select dedicated preamble. So during the RA procedure, one random access attempt can be CFRA while other random access attempt can be CBRA.

2 step contention based random access (2 step CBRA): In the first step, UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e. gNB) within a configured window. The response is also referred as MsgB. Next generation node B (gNB) transmits the MsgB on physical downlink shared channel (PDSCH). PDCCH scheduling the PDSCH carrying MsgB is addressed to MsgB-radio network temporary identifier (MSGB-RNTI). MSGB-RNTI identifies the time-frequency resource (also referred as physical RA channel (PRACH) occasion or PRACH transmission (TX) occasion or RA channel (RACH) occasion) in which RA preamble was detected by gNB. The MSGB-RNTI is calculated as follows: RA-RNTI=1+s_id+14*t_id+14*80*f_id+14*80*8*ul_carrier_id+14×80×8×2, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If CCCH (common control channel) SDU (service data unit) was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e. UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI (international mobile subscriber identity), idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. The response is also referred as MsgB.

Next generation node B (gNB) transmits the MsgB on physical downlink shared channel (PDSCH). PDCCH scheduling the PDSCH carrying MsgB is addressed to MsgB-radio network temporary identifier (MSGB-RNTI). MSGB-RNTI identifies the time-frequency resource (also referred as physical RA channel (PRACH) occasion or PRACH transmission (TX) occasion or RA channel (RACH) occasion) in which RA preamble was detected by gNB. The MSGB-RNTI is calculated as follows: RA-RNTI=1+s_id+14*t_id+14*80*f_id+14*80*8*ul_carrier_id+14×80×8×2, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non-dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs/PUSCH resources) are provided by gNB, UE select non dedicated preamble. Otherwise UE select dedicated preamble. So during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signalled by gNB, UE select the signalled carrier for performing Random Access procedure. If the carrier to use for the Random Access procedure is not explicitly signalled by gNB; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE select the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

- If this random access procedure is initiated by PDCCH order and if the ra-PreambleIndex explicitly provided by PDCCH is not 0b000000, UE selects 4 step RACH.
- else if 2 step contention free random access resources are signaled by gNB for this random access procedure, UE selects 2 step RACH.
- else if 4 step contention free random access resources are signaled by gNB for this random access procedure, UE selects 4 step RACH.
- else if the UL BWP selected for this random access procedure is configured with only 2 step RACH resources, UE selects 2 step RACH.
- else if the UL BWP selected for this random access procedure is configured with only 4 step RACH resources, UE selects 4 step RACH.
- else if the UL BWP selected for this random access procedure is configured with both 2 step and 4 step RACH resources,
- if RSRP of the downlink pathloss reference is below a configured threshold, UE selects 4 step RACH. Otherwise UE selects 2 step RACH.

BWP (bandwidth part) operation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a bandwidth part (BWP). BA is achieved by configuring RRC (radio resource control) connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the fifth generation wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e. no RRC connection is established, the UE is in RRC_IDLE state. The RRC states can further be characterized as follows:

In the RRC_IDLE, a UE specific discontinuous (DRX) may be configured by upper layers. The UE monitors Short Messages transmitted with paging RNTI (P-RNTI) over DCI (downlink control information); monitors a Paging channel for CN paging using 5G-S-temporary mobile subscriber identity (5G-S-TMSI); performs neighboring cell measurements and cell (re-)selection; acquires system information and can send SI (system information) request (if configured); performs logging of available measurements together with location and time for logged measurement configured UEs.

In RRC_INACTIVE, a UE specific DRX may be configured by upper layers or by RRC layer; UE stores the UE Inactive AS (access stratum) context; a RAN-based notification area is configured by RRC layer. The UE monitors Short Messages transmitted with P-RNTI over DCI; monitors a Paging channel for CN paging using 5G-S-TMSI and RAN paging using fullI-RNTI; performs neighbouring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighbouring cell measurements and measurement reporting; acquires system information.

PDCCH in fifth generation wireless communication system: In the fifth generation wireless communication system, Physical Downlink Control Channel (PDCCH) is used to schedule DL transmissions on PDSCH and UL transmissions on PUSCH, where the Downlink Control Information (DCI) on PDCCH includes: Downlink assignments containing at least modulation and coding format, resource allocation, and hybrid-ARQ (hybrid automatic repeat request) information related to DLSCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured control resource sets (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations is signaled by gNB for each configured BWP of serving cell wherein each search configuration is uniquely identified by a search space identifier. Search space identifier is unique amongst the BWPs of a serving cell. Identifier of search space configuration to be used for specific purpose such as paging reception, SI reception, random access response reception is explicitly signaled by gNB for each configured BWP. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y^*(\text{number of slots in a radio frame})+x-\text{Monitoring-offset-PDCCH-slot})\bmod(\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the CORESET associated with the search space. search space configuration includes the identifier of CORESET configuration associated with it. A list of CORESET configurations are signaled by gNB for each configured BWP of serving cell wherein each CORESET configuration is uniquely identified by a CORESET identifier. CORESET identifier is unique amongst the BWPs of a serving cell. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS (subcarrier spacing) is pre-defined in NR. Each CORESET configuration is associated with a list of TCI (Transmission configuration indicator) states. One DL RS ID (SSB or CSI RS) is configured per TCI state. The list of TCI states corresponding to a CORESET configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by gNB for transmission of PDCCH in the PDCCH monitoring occasions of a search space.

In fifth generation wireless communication system, dynamic spectrum sharing (DSS) is supported. Dynamic spectrum sharing (DSS) provides a very useful migration path from LTE to NR by allowing LTE and NR to share the same carrier. DSS enables network operators to simultaneously use a single legacy LTE carrier for both LTE and NR services, without the need for spectrum re-farming. To achieve simultaneous and high spectrum utilization, resources are dynamically coordinated between LTE and NR according to the change in LTE and NR traffic load.

As the number of NR devices in a network increases, scheduling capacity of NR UEs on the shared carrier is insufficient. For NR UEs, it is mandatory to support CORESET configuration within the first 3 symbols. LTE PDCCH is also supported in first 3 symbols. Since both LTE and NR PDCCH share the first three OFDM symbols, the PDCCH capacity in DSS can be somewhat limited compared to that of the capacity in non-DSS. To overcome the PDCCH capacity issue, PDCCH enhancements for cross carrier scheduling are being considered. PDCCH of SCell can schedule PDSCH of PRSCH on P(S)Cell. So if carrier of P(S)Cell is shared between LTE and NR, there will not be any NR PDCCH capacity issues.

Issue:

UE transmits PRACH preamble (or PRACH preamble and MsgA MAC PDU) towards SpCell

UE receives RAR (or fallbackRAR)

UE transmits Msg3 in UL grant received in RAR/fallbackRAR and starts contention resolution timer While the contention resolution timer is running:

if notification of a reception of a PDCCH transmission from the SpCell is received from lower layers:

if the C-RNTI MAC CE was included in Msg3:

if the Random Access procedure was initiated for SpCell beam failure recovery and the PDCCH transmission is addressed to the C-RNTI; or if the Random Access procedure was initiated by a PDCCH order and the PDCCH transmission is addressed to the C-RNTI; or if the Random Access procedure was initiated by the MAC sublayer itself or by the RRC sublayer and the PDCCH transmission is addressed to the C-RNTI and contains a UL grant for a new transmission:

consider this Contention Resolution successful;

consider this Random Access procedure successfully completed.

In case of DSS, UE specific search space (for scheduling PDCCH addresses to C-RNTI) may not be supported in SpCell. So contention resolution procedure needs to be enhanced.

Method 1

FIG. 1 is an example signalling flow according to this method of disclosure wherein UE transmit C-RNTI MAC CE in Msg3 and SpCell scheduling by SCell is supported.

UE (101) receives RRCReconfiguration message from network (e.g. gNB)(110). RRCReconfiguration includes configuration of one or more serving cells. The configuration of SpCell (103) includes information about the scheduling cell of SpCell (103). The information consists of schedulingCellId i.e. serving cell index of serving cell (i.e. SCell (105)) which schedules this SpCell (103). A serving cell (i.e. SCell) scheduling SpCell means that PDCCH carrying scheduling resources for PUSCH transmission or PDSCH reception of SpCell or carrying other downlink control information for SpCell is transmitted on that serving cell (i.e. SCell). The information further consists of a field (cif-InSchedulingCell) that indicates the CIF value used in the scheduling cell to indicate a grant or assignment applicable for the SpCell. In an embodiment multiple scheduling cells (i.e. schedulingCellId) can be configured for SpCell. cif-InSchedulingCell is configured for each scheduling cell.

Random access is initiated on SpCell (103). Random access can be initiated in UE (101) for beam failure recovery. Random access can be initiated by MAC layer in UE (101) for scheduling request. Random access can be initiated by RRC layer in UE (101) for reconfiguration with sync (e.g. handover, SCG addition, etc.). Random access can be initiated by gNB by sending PDCCH order to UE (101).

UE (101) transmits PRACH preamble (in case of 4 step random access) in PRACH occasion (120) or UE (101) transmits PRACH preamble in PRACH occasion and MsgA MAC PDU in PUSCH occasion in case of 2 step random access (130, 133). These transmissions are done towards SpCell (103).

UE (101) monitors PDCCH addressed to RA-RNTI from SpCell (103) in RAR window in case of 4 step random access (125). UE (101) monitors PDCCH addressed to MSGB-RNTI from SpCell (103) in MsgB response window in case of 2 step random access (135).

UE (101) receives the PDCCH and decoded the scheduled TB which includes RAR MAC PDU in case of 4 step random access (125). UE (101) receives the PDCCH and decoded the scheduled TB which includes MsgB MAC PDU in case of 2 step random access (135). RAR MAC PDU includes RAR corresponding to PRACH preamble transmitted by UE (101) (i.e. MAC subheader of RAR MAC SDU in RAR MAC PDU includes RAPID of PRACH preamble transmitted by UE (101)). MsgB MAC PDU includes fallbackRAR corresponding to PRACH preamble transmitted by UE (101) (i.e. MAC subheader of fallbackRAR MAC SDU in MsgB MAC PDU includes RAPID of PRACH preamble transmitted by UE (101)). RAR and fallbackRAR MAC SDU includes UL grant.

UE (101) transmits Msg3 in UL grant received in RAR/fallbackRAR and starts contention resolution timer (140, 150). C-RNTI MAC CE may be included in the Msg3.

While the contention resolution timer is running:

if notification of a reception of a PDCCH transmission from the SpCell (103) is received from lower layers (i.e. PDCCH transmission from the SpCell (103) is received by UE (101)):

OR if schedulingCellId is configured for the SpCell (103) and if notification of a reception of a PDCCH transmission for the SpCell (103) from the SCell (105) indicated by schedulingCellId is received from lower layers (i.e. if schedulingCellId is configured for the SpCell (103) and if PDCCH transmission for the SpCell (103) from the SCell (105) indicated by schedulingCellId is received by UE (101)) (160):

(Alt) if cross carrier scheduling by SCell (105) is supported for SpCell (103) and if notification of a reception of a PDCCH transmission for the SpCell (103) from the SCell (105) scheduling SpCell (103) is received from lower layers (i.e. if cross carrier scheduling by SCell (101) is supported for SpCell (103) and if PDCCH transmission for the SpCell (103) from the SCell (105) scheduling SpCell (103) is received by UE (101)) (160):

if the C-RNTI MAC CE was included in Msg3:

if the Random Access procedure was initiated for SpCell beam failure recovery and the PDCCH transmission is addressed to the C-RNTI (170); or if the Random Access procedure was initiated by a PDCCH order and the PDCCH transmission is addressed to the C-RNTI (180); or if the Random Access procedure was initiated by the MAC sublayer itself or by the RRC sublayer and the PDCCH transmission is addressed to the C-RNTI and contains a UL grant for a new transmission (190):

consider this Contention Resolution successful (170, 180, 190);

consider this Random Access procedure successfully completed (170, 180, 190).

schedulingCellId is configured for the SpCell means that serving cell index of serving cell (i.e. SCell) which schedules the SpCell is indicated in the SpCell configuration received from gNB in RRCReconfiguration message. A serving cell (i.e. SCell) scheduling SpCell means that PDCCH carrying scheduling resources for PUSCH transmission or PDSCH reception of SpCell is transmitted on that serving cell (i.e. SCell). PDCCH transmitted on scheduling serving cell (i.e. SCell) may include an indication (e.g. carrier index/Cid/cif of SpCell or SpCell indicator) in DCI that scheduling information in DCI is for SpCell. The CIF to be used in DCI of scheduling serving cell (i.e. SCell) can be signalled by parameter cif-InSchedulingCell in SpCell configuration in RRC reconfiguration message. One or more SCells can be configured in RRCReconfiguration message and each of them is identified by serving cell index. Serving cell index of each SCell is signalled in RRCReconfiguration message.

FIG. 2 is an example UE operation according to this method of disclosure wherein UE transmit C-RNTI MAC CE in Msg3.

Referring to FIG. 2, at step 210, UE initiates random access procedure on SpCell. A detailed description has been described in the description related to FIG. 1. The following steps have been described in detail with reference to FIG. 1 as well.

At step 220, UE transmits PRACH preamble in PARCH occasion, in case of 4 step random access. Or UE transmits PRACH preamble in PARCH occasion and MsgA MAC PDU in PUSCH occasion, in case of 2 step random access.

At step 230, UE receives RAR in case of 4 step random access. Or UE receives fallbackRAR in case of 2 step random access.

At step 240, UE transmits Msg3 in UL grant received in RAR/fallbackRAR. And, UE starts contention resolution timer. In an embodiment, the transmitting of the Msg3 and the starting the contention resolution timer can be done simultaneously. In an embodiment, the transmitting of the Msg3 is performed and then the starting the contention resolution timer is performed. In an embodiment, the starting the contention resolution timer is performed and then the transmitting of the Msg3 is performed. C-RNTI MAC CE is included in Msg3.

At step 250, UE receives PDCCH addressed to C-RNTI.

At step 260, UE determines whether schedulingCellID is configured for the SpCell, received PDCCH is from SCell indicated by the schedulingCellID, and the PDCCH is for the SpCell.

If it is determined that at least one of schedulingCellID is not configured for the SpCell, received PDCCH is not from SCell indicated by the schedulingCellID, or the PDCCH is not for the SpCell, at step 265, UE determines whether the received PDCCH is from SpCell. If the received PDCCH is not from SpCell, the UE receives PDCCH addressed to C-RNTI at step 250. And, if the received PDCCH is from SpCell, the UE proceeds to step 270.

If schedulingCellID is configured for the SpCell, received PDCCH is from SCell indicated by the schedulingCellID, and the PDCCH is for the SpCell, at step 270, UE determines whether the random access procedure was initiated for SpCell beam failure recovery. If the random access procedure was initiated for SpCell beam failure recovery, the UE considers this contention resolution successful, and considers this Random Access procedure successfully completed.

If the random access procedure was not initiated for SpCell beam failure recovery, at step 280, UE determines whether the random access procedure was initiated by PDCCH order. If the random access procedure was initiated by PDCCH order, the UE considers this contention resolution successful, and considers this Random Access procedure successfully completed.

If the random access procedure was not initiated for SpCell beam failure recovery, at step 290, UE determines whether the random access procedure was initiated by the MAC sublayer itself or by the RRC sublayer and the PDCCH transmission is addressed to the C-RNTI and contains a UL grant for a new transmission. If the random access procedure was initiated by the MAC sublayer itself or by the RRC sublayer and the PDCCH transmission is addressed to the C-RNTI and contains a UL grant for a new transmission, the UE considers this contention resolution successful, and considers this Random Access procedure successfully completed. Step 270 to step 290 may be performed interchangeably or may be performed as one step.

Method 2

FIG. 3 is an example UE operation according to this method of disclosure wherein UE transmit C-RNTI MAC CE in Msg3.

UE receives RRCReconfiguration message from network (e.g. gNB). RRCReconfiguration includes configuration of one or more serving cells. The configuration of SpCell includes information about the scheduling cell of SpCell. The information consists of schedulingCellId i.e. serving cell index of serving cell (i.e. SCell) which schedules this SpCell. A serving cell (i.e. SCell) scheduling SpCell means that PDCCH carrying scheduling resources for PUSCH transmission or PDSCH reception of SpCell or carrying other downlink control information for SpCell is transmitted on that serving cell (i.e. SCell). The information further consists of a field (cif-InSchedulingCell) that indicates the CIF value used in the scheduling cell to indicate a grant or assignment applicable for the SpCell. In an embodiment multiple scheduling cells (i.e. schedulingCellId) can be configured for SpCell. cif-InSchedulingCell is configured for each scheduling cell.

Random access is initiated on SpCell (310). Random access can be initiated by MAC layer in UE for beam failure recovery. Random access can be initiated by MAC layer in UE for scheduling request. Random access can be initiated by RRC layer in UE for reconfiguration with sync (e.g. handover, SCG addition, etc.). Random access can be initiated by gNB by sending PDCCH order to UE.

UE transmits PRACH preamble (in case of 4 step random access) in PRACH occasion or UE transmits PRACH preamble in PRACH occasion and MsgA MAC PDU in PUSCH occasion in case of 2 step random access (320). These transmissions are done towards SpCell.

UE monitors PDCCH addressed to RA-RNTI from SpCell in RAR window in case of 4 step random access. UE monitors PDCCH addressed to MSGB-RNTI from SpCell in MsgB response window in case of 2 step random access.

UE receives the PDCCH and decoded the scheduled TB which includes RAR MAC PDU in case of 4 step random access (330). UE receives the PDCCH and decoded the scheduled TB which includes MsgB MAC PDU in case of 2 step random access (330). RAR MAC PDU includes RAR corresponding to PRACH preamble transmitted by UE (i.e. MAC subheader of RAR MAC SDU in RAR MAC PDU includes RAPID of PRACH preamble transmitted by UE). MsgB MAC PDU includes fallbackRAR corresponding to PRACH preamble transmitted by UE (i.e. MAC subheader of fallbackRAR MAC SDU in MsgB MAC PDU includes RAPID of PRACH preamble transmitted by UE). RAR and fallbackRAR MAC SDU includes UL grant.

UE transmits Msg3 in UL grant received in RAR/fallbackRAR and starts contention resolution timer (340). C-RNTI MAC CE may be included in the Msg3.

While the contention resolution timer is running:

if schedulingCellId is not configured for the SpCell (360) and if notification of a reception of a PDCCH transmission from the SpCell is received from lower layers (i.e. PDCCH transmission from the SpCell is received by UE) (365):

OR if schedulingCellId is configured for the SpCell (360) and if notification of a reception of a PDCCH transmission for the SpCell from the SCell indicated by schedulingCellId is received from lower layers (i.e. if schedulingCellId is configured for the SpCell and if PDCCH transmission for the SpCell from the SCell indicated by schedulingCellId is received) (370):

(Alt) if cross carrier scheduling by SCell is supported for SpCell and if notification of a reception of a PDCCH transmission for the SpCell from the SCell scheduling SpCell is received from lower layers (i.e. if cross carrier scheduling by SCell is supported for SpCell and if PDCCH transmission for the SpCell from the SCell scheduling SpCell is received) (360, 370):

if the C-RNTI MAC CE was included in Msg3:

if the Random Access procedure was initiated for SpCell beam failure recovery and the PDCCH transmission is addressed to the C-RNTI (350, 375); or if the Random Access procedure was initiated by a PDCCH order and the PDCCH transmission is addressed to the C-RNTI (350, 380); or if the Random Access procedure was initiated by the MAC sublayer itself or by the RRC sublayer and the PDCCH transmission is addressed to the C-RNTI and contains a UL grant for a new transmission (3350, 390):

consider this Contention Resolution successful (375, 380, 390);

consider this Random Access procedure successfully completed (375, 380, 390).

schedulingCellId is configured for the SpCell means that serving cell index of serving cell (i.e. SCell) which schedules the SpCell is indicated in the SpCell configuration received from gNB in RRCReconfiguration message. A serving cell (i.e. SCell) scheduling SpCell means that PDCCH carrying scheduling resources for PUSCH transmission or PDSCH reception of SpCell is transmitted on that serving cell (i.e. SCell). PDCCH transmitted on scheduling serving cell (i.e. SCell) may include an indication (e.g. carrier index/Cid/cif of SpCell or SpCell indicator) in DCI that scheduling information in DCI is for SpCell. The CIF to be used in DCI of scheduling serving cell (i.e. SCell) can be signalled by parameter cif-InSchedulingCell in SpCell configuration in RRC reconfiguration message. One or more SCells can be configured in RRCReconfiguration message and each of them is identified by serving cell index. Serving cell index of each SCell is signalled in RRCReconfiguration message.

Referring to FIG. 3, at step 310, UE initiates random access procedure on SpCell. A detailed description has been described in the description related to FIG. 1. The following steps have been described in detail with reference to FIG. 1 as well.

At step 320, UE transmits PRACH preamble in PARCH occasion, in case of 4 step random access. Or UE transmits PRACH preamble in PARCH occasion and MsgA MAC PDU in PUSCH occasion, in case of 2 step random access.

At step 330, UE receives RAR in case of 4 step random access. Or UE receives fallbackRAR in case of 2 step random access.

At step 340, UE transmits Msg3 in UL grant received in RAR/fallbackRAR. And, UE starts contention resolution timer. In an embodiment, the transmitting of the Msg3 and the starting the contention resolution timer can be done simultaneously. In an embodiment, the transmitting of the Msg3 is performed and then the starting the contention resolution timer is performed. In an embodiment, the starting the contention resolution timer is performed and then the transmitting of the Msg3 is performed. C-RNTI MAC CE is included in Msg3.

At step 350, UE receives PDCCH addressed to C-RNTI.

At step 360, UE determines whether schedulingCellID is configured for the SpCell.

If the schedulingCellID is not configured for the SpCell, at step 365, UE determines whether the received PDCCH is from SpCell. If the received PDCCH is not from SpCell, the UE receives PDCCH addressed to C-RNTI at step 350. And, if the received PDCCH is from SpCell, the UE proceeds to step 375.

If the schedulingCellID is configured for the SpCell, at step 370, UE determines whether received PDCCH is from SCell indicated by the schedulingCellID and the PDCCH is for the SpCell.

If it is determined that at least one of received PDCCH is not from SCell indicated by the schedulingCellID or the PDCCH is not for the SpCell, the UE receives PDCCH addressed to C-RNTI at step 350.

If schedulingCellID is configured for the SpCell, received PDCCH is from SCell indicated by the schedulingCellID, and the PDCCH is for the SpCell, at step 375, UE determines whether the random access procedure was initiated for SpCell beam failure recovery. If the random access procedure was initiated for SpCell beam failure recovery, the UE considers this contention resolution successful, and considers this Random Access procedure successfully completed.

If the random access procedure was not initiated for SpCell beam failure recovery, at step 380, UE determines whether the random access procedure was initiated by PDCCH order. If the random access procedure was initiated by PDCCH order, the UE considers this contention resolution successful, and considers this Random Access procedure successfully completed.

If the random access procedure was not initiated for SpCell beam failure recovery, at step 390, UE determines whether the random access procedure was initiated by the MAC sublayer itself or by the RRC sublayer and the PDCCH transmission is addressed to the C-RNTI and contains a UL grant for a new transmission. If the random access procedure was initiated by the MAC sublayer itself or by the RRC sublayer and the PDCCH transmission is addressed to the C-RNTI and contains a UL grant for a new transmission, the UE considers this contention resolution successful, and considers this Random Access procedure successfully completed. Step 375 to step 390 may be performed interchangeably or may be performed as one step.

Method 3

UE receives RRCReconfiguration message from network (e.g. gNB). RRCReconfiguration includes configuration of one or more serving cells. The configuration of SpCell includes information about the scheduling cell of SpCell. The information consists of schedulingCellId i.e. serving cell index of serving cell (i.e. SCell) which schedules this SpCell. A serving cell (i.e. SCell) scheduling SpCell means that PDCCH carrying scheduling resources for PUSCH transmission or PDSCH reception of SpCell or carrying other downlink control information for SpCell is transmitted on that serving cell (i.e. SCell). The information further consists of a field (cif-InSchedulingCell) that indicates the CIF value used in the scheduling cell to indicate a grant or assignment applicable for the SpCell. In an embodiment multiple scheduling cells (i.e. schedulingCellId)

can be configured for SpCell. cif-InSchedulingCell is configured for each scheduling cell.

Random access is initiated on SpCell. Random access can be initiated by MAC layer in UE for beam failure recovery. Random access can be initiated by MAC layer in UE for scheduling request. Random access can be initiated by RRC layer in UE for reconfiguration with sync (e.g. handover, SCG addition, etc.). Random access can be initiated by gNB by sending PDCCH order to UE.

UE transmits PRACH preamble in PRACH occasion and MsgA MAC PDU in PUSCH occasion. These transmissions are done towards SpCell.

if C-RNTI MAC CE was included in the MsgA:

UE monitors the PDCCH of the SpCell for Random Access Response identified by the C-RNTI while the msgB-ResponseWindow is running.

if schedulingCellId is configured for the SpCell, UE monitors the PDCCH of the SCell indicated by schedulingCellId for Random Access Response identified by the C-RNTI while the msgB-ResponseWindow is running (i.e. if cross carrier scheduling by SCell is supported for SpCell, UE monitors the PDCCH of the SCell scheduling SpCell Random Access Response identified by the C-RNTI while the msgB-ResponseWindow is running).

While the msgB-ResponseWindow is running:

if notification of a reception of a PDCCH transmission from the SpCell is received from lower layers (i.e. PDCCH transmission from the SpCell is received by UE):

OR if schedulingCellId is configured for the SpCell and if notification of a reception of a PDCCH transmission for the SpCell from the SCell indicated by schedulingCellId is received from lower layers (i.e. if schedulingCellId is configured for the SpCell and if PDCCH transmission for the SpCell from the SCell indicated by schedulingCellId is received):

(Alt) if cross carrier scheduling by SCell is supported for SpCell and if notification of a reception of a PDCCH transmission for the SpCell from the SCell scheduling SpCell is received from lower layers (i.e. if cross carrier scheduling by SCell is supported for SpCell and if PDCCH transmission for the SpCell from the SCell scheduling SpCell is received):

if the C-RNTI MAC CE was included in MsgA MAC PDU:

if the timeAlignmentTimer associated with the PTAG is running:

If the PDCCH transmission is addressed to the C-RNTI and contains a UL grant for a new transmission: consider this Random Access procedure successfully completed.

Else if the timeAlignmentTimer associated with the PTAG is not running: if a downlink assignment has been received on the PDCCH for the C-RNTI and the received TB is successfully decoded and if the MAC PDU contains the Absolute Timing Advance Command MAC CE, consider this Random Access procedure successfully completed.

schedulingCellId is configured for the SpCell means that serving cell index of serving cell (i.e. SCell) which schedules the SpCell is indicated in the SpCell configuration received from gNB in RRCReconfiguration message. A serving cell (i.e. SCell) scheduling SpCell means that PDCCH carrying scheduling resources for PUSCH transmission or PDSCH reception of SpCell is transmitted on that serving cell (i.e. SCell). PDCCH transmitted on scheduling serving cell (i.e. SCell) may include an indication (e.g. carrier index/Cid/cif of SpCell or SpCell indicator) in DCI that scheduling information in DCI is for SpCell. The cif to be used in DCI of scheduling serving cell (i.e. SCell) can be signalled by parameter cif-InSchedulingCell in SpCell configuration in RRC reconfiguration message. One or more SCells can be configured in RRCReconfiguration message and each of them is identified by serving cell index. Serving cell index of each SCell is signalled in RRCReconfiguration message.

Method 4

UE receives RRCReconfiguration message from network (e.g. gNB). RRCReconfiguration includes configuration of one or more serving cells. The configuration of SpCell includes information about the scheduling cell of SpCell. The information consists of schedulingCellId i.e. serving cell index of serving cell (i.e. SCell) which schedules this SpCell. A serving cell (i.e. SCell) scheduling SpCell means that PDCCH carrying scheduling resources for PUSCH transmission or PDSCH reception of SpCell or carrying other downlink control information for SpCell is transmitted on that serving cell (i.e. SCell). The information further consists of a field (cif-InSchedulingCell) that indicates the CIF value used in the scheduling cell to indicate a grant or assignment applicable for the SpCell. In an embodiment multiple scheduling cells (i.e. schedulingCellId) can be configured for SpCell. cif-InSchedulingCell is configured for each scheduling cell.

Random access is initiated on SpCell. Random access can be initiated by MAC layer in UE for beam failure recovery. Random access can be initiated by MAC layer in UE for scheduling request. Random access can be initiated by RRC layer in UE for reconfiguration with sync (e.g. handover, SCG addition, etc.). Random access can be initiated by gNB by sending PDCCH order to UE.

UE transmits PRACH preamble in PRACH occasion and MsgA MAC PDU in PUSCH occasion. These transmissions are done towards SpCell.

if C-RNTI MAC CE was included in the MsgA:

if schedulingCellId is not configured for the SpCell (i.e. if cross carrier scheduling by SCell is not supported for SpCell), UE monitors the PDCCH of the SpCell for Random Access Response identified by the C-RNTI while the msgB-ResponseWindow is running.

if schedulingCellId is configured for the SpCell, UE monitors the PDCCH of the SCell indicated by schedulingCellId for Random Access Response identified by the C-RNTI while the msgB-ResponseWindow is running (i.e. if cross carrier scheduling by SCell is supported for SpCell, UE monitors the PDCCH of the SCell scheduling SpCell Random Access Response identified by the C-RNTI while the msgB-ResponseWindow is running).

While the msgB-ResponseWindow is running:

if schedulingCellId is configured for the SpCell and if notification of a reception of a PDCCH transmission from the SpCell is received from lower layers (i.e. PDCCH transmission from the SpCell is received by UE):

OR if schedulingCellId is configured for the SpCell and if notification of a reception of a PDCCH transmission for the SpCell from the SCell indicated by schedulingCellId is received from lower layers (i.e. if schedulingCellId is configured for the SpCell and if PDCCH transmission for the SpCell from the SCell indicated by schedulingCellId is received):

(Alt) if cross carrier scheduling by SCell is supported for SpCell and if notification of a reception of a PDCCH transmission for the SpCell from the SCell scheduling SpCell is received from lower layers (i.e. if cross carrier scheduling by SCell is supported for SpCell and if PDCCH transmission for the SpCell from the SCell scheduling SpCell is received):

if the C-RNTI MAC CE was included in MsgA MAC PDU:

if the timeAlignmentTimer associated with the PTAG is running: If the PDCCH transmission is addressed to the C-RNTI and contains a UL grant for a new transmission, consider this Random Access procedure successfully completed.

Else if the timeAlignmentTimer associated with the PTAG is not running: if a downlink assignment has been received on the PDCCH for the C-RNTI and the received TB is successfully decoded and if the MAC PDU contains the Absolute Timing Advance Command MAC CE, consider this Random Access procedure successfully completed.

schedulingCellId is configured for the SpCell means that serving cell index of serving cell (i.e. SCell) which schedules the SpCell is indicated in the SpCell configuration received from gNB in RRCReconfiguration message. A serving cell (i.e. SCell) scheduling SpCell means that PDCCH carrying scheduling resources for PUSCH transmission or PDSCH reception of SpCell is transmitted on that serving cell (i.e. SCell). PDCCH transmitted on scheduling serving cell (i.e. SCell) may include an indication (e.g. carrier index/Cid/cif of SpCell or SpCell indicator) in DCI that scheduling information in DCI is for SpCell. The cif to be used in DCI of scheduling serving cell (i.e. SCell) can be signalled by parameter cif-InSchedulingCell in SpCell configuration in RRC reconfiguration message. One or more SCells can be configured in RRCReconfiguration message and each of them is identified by serving cell index. Serving cell index of each SCell is signalled in RRCReconfiguration message.

FIG. 4 is a diagram illustrating a configuration of a terminal according to the disclosure.

The terminal (UE) according to an embodiment of the disclosure may include a transceiver 420 and a controller 410 that controls the overall operation of the terminal. The transceiver 420 may include a transmitter 421 and a receiver 423.

The transceiver 420 may transmit and receive signals to and from other network entities.

The controller 410 may control the terminal to perform one operation in the above-described embodiments. Meanwhile, the controller 410 and the transceiver 420 do not have to be implemented as separated modules but may be implemented as one element such as a single chip. The controller 410 and the transceiver 420 may be electrically connected. For example, the controller 410 may be a circuit, an application-specific circuit, or at least one processor. Further, the operations of the terminal may be performed by including a memory device storing a corresponding program code in a predetermined element within the terminal.

FIG. 5 is a diagram illustrating a configuration of a base station according to the disclosure.

The base station according to an embodiment of the disclosure may include a transceiver 520 and a controller 510 that controls the overall operation of the base station. The transceiver 520 may include a transmitter 521 and a receiver 523.

The transceiver 520 may transmit and receive signals to and from network entities and the terminal.

The controller 510 may control the base station to perform one operation in the above-described embodiments. Meanwhile, the controller 510 and the transceiver 520 do not have be implemented as separated modules but may be implemented as one element such as a single chip. The controller 510 and the transceiver 520 may be electrically connected. For example, the controller 510 may be a circuit, an application-specific circuit, or at least one processor. Further, the operations of the base station may be performed by including a memory device storing a corresponding program code in a predetermined element within the base station.

It should be noted that the block diagrams, example diagrams of a control/data signal transmission method, example diagrams of an operation procedure, and diagrams illustrated in FIGS. 1 to 5 have no intent to limit the scope of the disclosure. That is, it should not be construed that all element parts, entities, or operations shown in FIGS. 1 to 5 are essential elements for implementing the disclosure, and it should be understood that only a few elements may implement the disclosure within the scope without departing the subject matter of the disclosure.

The operations of the base station or the UE may be performed when a predetermined element within the base station or the UE apparatus includes a memory device storing the corresponding program code. That is, the controller of the base station or the UE apparatus may perform the operations by reading and executing the program code stored in the memory device through a processor or a Central Processing Unit (CPU).

Various elements and modules of the entity, the base station, or the UE used in the specification may operate by using a hardware circuit, for example, a combination of a complementary metal oxide semiconductor-based logical circuit, firmware, software and/or hardware, or a combination of firmware and/or software inserted into a machine-readable medium. For example, various electrical structures and methods may be performed using transistors, logic gates, and electrical circuits such as application specific integrated circuit.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

The invention claimed is:

1. A method performed by a terminal in a wireless communication system, the method comprising:

receiving, from a base station, configuration information on a special cell (SpCell);

initiating a random access procedure;

transmitting, to the SpCell, a random access preamble;

receiving, from the SpCell, a random access response as a response to the random access preamble;

transmitting, to the SpCell, a message 3 (Msg3) based on the random access response;

in case that the configuration information comprises information indicating that scheduling information for the SpCell is transmitted on a secondary cell (SCell), receiving, from the SCell, a PDCCH for the SpCell as a response to the Msg3; and in case that the received PDCCH from the SCell was addressed to a cell-radio network temporary identifier (C-RNTI) included in the Msg3 and the random access procedure was initiated for a SpCell beam failure recovery or was initiated by a physical downlink control channel (PDCCH) order, considering a contention resolution successful and considering the random access procedure successfully completed.

2. The method of claim 1, further comprising:

in case that the configuration information does not comprise the information indicating that the scheduling information for the SpCell is transmitted on the SCell, receiving, from the SpCell, a PDCCH for the SpCell as a response to the Msg3.

3. The method of claim 1, further comprising:

starting a contention resolution timer in case that the Msg3 is transmitted, and wherein the PDCCH is received during the contention resolution timer is running.

4. The method of claim 1, further comprising:

in case that the random access procedure is 2 step random access procedure, receiving, from the SpCell, a fallback random access response;

transmitting, to the SpCell, the Msg3 based on the fallback random access response; and in case that the configuration information comprises the information indicating that scheduling information for the SpCell is transmitted on the SCell, receiving, from the SCell, a PDCCH for the SpCell, as a response to the Msg3.

5. The method of claim 1, wherein the information indicating that the scheduling information for the SpCell is transmitted on the SCell comprises at least one of an indication indicating whether the scheduling information for the SpCell is transmitted on the SCell, or an identifier of the SCell.

6. The method of claim 1 further comprising in case that the received PDCCH from the SCell was addressed to the C-RNTI and the random access procedure was initiated by a medium access control (MAC) sublayer or a radio resource control (RRC) sublayer and the received PDCCH schedules an uplink (UL) grant for a new transmission, considering the contention resolution successful and considering the random access procedure successfully completed.

7. A method performed by a base station in a wireless communication system, the method comprising:

transmitting, to a terminal, configuration information on a special cell (SpCell);

receiving, from the terminal on the SpCell, a random access preamble;

transmitting, to the terminal on the SpCell, a random access response as a response to the random access preamble;

receiving, from the terminal the SpCell, a message 3 (Msg3) based on the random access response; and in case that the configuration information comprises information indicating that scheduling information for the SpCell is transmitted on a secondary cell (SCell), transmitting, to the terminal on the SCell, a PDCCH for the SpCell as a response to the Msg3, wherein, in case that the transmitted PDCCH from the SCell was addressed to a cell-radio network temporary identifier (C-RNTI) included in the Msg3 and a random access procedure was initiated for a SpCell beam failure recovery or was initiated by a physical downlink control channel (PDCCH) order, a contention resolution is considered successful and the random access procedure is considered successfully completed.

8. The method of claim 7, further comprising:

in case that the configuration information does not comprise the information indicating that the scheduling information for the SpCell is transmitted on the SCell, transmitting, to the terminal the SpCell, a PDCCH for the SpCell as a response to the Msg3.

9. The method of claim 7, further comprising:

in case that the random access procedure is 2 step random access procedure, transmitting, to the terminal on the the SpCell, a fallback random access response;

receiving, from the terminal on the SpCell, the Msg3 based on the fallback random access response; and in case that the configuration information comprises the information indicating that scheduling information for the SpCell is transmitted on the SCell, transmitting, to the terminal on the SCell, a PDCCH for the SpCell, as a response to the Msg3.

10. The method of claim 7, wherein the information indicating that the scheduling information for the SpCell is transmitted on the SCell comprises at least one of an indication indicating whether the scheduling information for the SpCell is transmitted on the SCell, or an identifier of the SCell.

11. The method of claim 10, wherein, in case that the transmitted PDCCH from the SCell was addressed to the C-RNTI and the random access procedure was initiated by a medium access control (MAC) sublayer or a radio resource control (RRC) sublayer and the transmitted PDCCH schedules an uplink (UL) grant for a new transmission, the contention resolution is considered successful and the random access procedure is considered successfully completed.

12. A terminal in a wireless communication system, the terminal comprising:

a transceiver; and a controller coupled with the transceiver and configured to:

receive, from a base station, configuration information on a special cell (SpCell), initiating a random access procedure, transmit, to the SpCell, a random access preamble, receive, from the SpCell, a random access response as a response to the random access preamble, transmit, to the SpCell, a message 3 (Msg3) based on the random access response, in case that the configuration information comprises information indicating that scheduling information for the SpCell is transmitted on a secondary cell (SCell), receive, from the SCell, a PDCCH for the SpCell as a response to the Msg3, in case that the received PDCCH from the SCell was addressed to a cell-radio network temporary identifier (C-RNTI) included in the Msg3 and the random access procedure was initiated for a SpCell beam failure recovery or was initiated by a physical downlink control channel (PDCCH) order, consider a contention resolution successful and consider the random access procedure successfully completed.

13. The terminal of claim 12, wherein the controller is further configured to:

in case that the configuration information does not comprise the information indicating that the scheduling information for the SpCell is transmitted on the SCell, receive, from the SpCell, a PDCCH for the SpCell as a response to the Msg3.

14. The terminal of claim 12, wherein the controller is further configured to:

start contention resolution timer in case that the Msg3 is transmitted, and wherein the PDCCH is received during the contention resolution timer is running.

15. The terminal of claim 12, wherein the information indicating that the scheduling information for the SpCell is transmitted on the SCell comprises at least one of an indication indicating whether the scheduling information for the SpCell is transmitted on the SCell, or an identifier of the SCell.

16. The terminal of claim 12, wherein the controller is further configured to:

in case that the random access procedure is 2 step random access procedure, receive, from the SpCell, a fallback random access response, transmit, to the SpCell, the Msg3 based on the fallback random access response, and in case that the configuration information comprises the information indicating that scheduling information for the SpCell is transmitted on the SCell, receive, from the SCell, a PDCCH for the SpCell, as a response to the Msg3.

17. The terminal of claim 12, wherein the controller is further configured to:

in case that the received PDCCH from the SCell was addressed to the C-RNTI and the random access procedure was initiated by a medium access control (MAC) sublayer or a radio resource control (RRC) sublayer and the received PDCCH schedules an uplink (UL) grant for a new transmission, consider the contention resolution successful and consider the random access procedure successfully completed.

18. A base station in a wireless communication system, the base station comprising:

a transceiver; and a controller coupled with the transceiver and configured to:

transmit, to a terminal, configuration information on a special cell (SpCell), receive, from the terminal on the SpCell, a random access preamble, transmit, to the terminal on the SpCell, a random access response as a response to the random access preamble, receive, from the terminal the SpCell, a message 3 (Msg3) based on the random access response, and in case that the configuration information comprises information indicating that scheduling information for the SpCell is transmitted on a secondary cell (SCell), transmit, to the terminal on the SCell, a PDCCH for the SpCell as a response to the Msg3, wherein in case that the transmitted PDCCH from the SCell was addressed to a cell-radio network temporary identifier (C-RNTI) included in the Msg3 and a random access procedure was initiated for a SpCell beam failure recovery or was initiated by a physical downlink control channel (PDCCH) order, a contention resolution is considered successful and the random access procedure is considered successfully completed.

19. The base station of claim 18, wherein the controller is further configured to:

in case that the configuration information does not comprise the information indicating that the scheduling information for the SpCell is transmitted on the SCell, transmit, to the terminal the SpCell, a PDCCH for the SpCell as a response to the Msg3, or in case that the random access procedure is 2 step random access procedure, transmit, to the terminal on the the SpCell, a fallback random access response, receive, from the terminal on the SpCell, the Msg3 based on the fallback random access response, and in case that the configuration information comprises the information indicating that scheduling information for the SpCell is transmitted on the SCell, transmit, to the terminal on the SCell, a PDCCH for the SpCell, as a response to the Msg3, wherein the information indicating that the scheduling information for the SpCell is transmitted on the SCell comprises at least one of an indication indicating whether the scheduling information for the SpCell is transmitted on the SCell, or an identifier of the SCell.

20. The base station of claim 18, wherein, in case that the transmitted PDCCH from the SCell was addressed to the C-RNTI and the random access procedure was initiated by a medium access control (MAC) sublayer or a radio resource control (RRC) sublayer and the transmitted PDCCH schedules an uplink (UL) grant for a new transmission, the contention resolution is considered successful and the random access procedure is considered successfully completed.

* * * * *